US010599352B2

(12) United States Patent
Yang et al.

(10) Patent No.: US 10,599,352 B2
(45) Date of Patent: Mar. 24, 2020

(54) ONLINE FLASH RESOURCE ALLOCATION MANAGER BASED ON A TCO MODEL

(71) Applicant: SAMSUNG ELECTRONICS CO., LTD., Suwon-si, Gyeonggi-do (KR)

(72) Inventors: Zhengyu Yang, Boston, MA (US); Mrinmoy Ghosh, Milpitas, CA (US); Manu Awasthi, San Jose, CA (US); Vijay Balakrishnan, Mountain View, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 51 days.

(21) Appl. No.: 15/092,156

(22) Filed: Apr. 6, 2016

(65) Prior Publication Data
US 2017/0046089 A1    Feb. 16, 2017

Related U.S. Application Data

(60) Provisional application No. 62/205,175, filed on Aug. 14, 2015, provisional application No. 62/208,309, filed on Aug. 21, 2015.

(51) Int. Cl.
*G06F 12/00* (2006.01)
*G06F 3/06* (2006.01)
*G06Q 10/06* (2012.01)

(52) U.S. Cl.
CPC .......... *G06F 3/0631* (2013.01); *G06F 3/0616* (2013.01); *G06F 3/0619* (2013.01); *G06F 3/0647* (2013.01); *G06F 3/0653* (2013.01); *G06F 3/0688* (2013.01); *G06F 12/00* (2013.01); *G06Q 10/06315* (2013.01)

(58) Field of Classification Search
CPC ....................................................... G06F 12/02
USPC ......................................................... 711/103
See application file for complete search history.

(56) References Cited

U.S. PATENT DOCUMENTS

| 8,046,767 | B2 | 10/2011 | Rolia et al. |
| 8,463,983 | B2 | 6/2013 | Eleftheriou et al. |
| 9,135,181 | B2 | 9/2015 | Eleftheriou et al. |
| 9,141,527 | B2 | 9/2015 | Atkisson et al. |
| 9,378,136 | B1* | 6/2016 | Martin ............... G06F 12/0246 |
| 9,450,876 | B1* | 9/2016 | Marr ................... H04L 47/125 |
| 9,626,116 | B1* | 4/2017 | Martin ................ G06F 3/0619 |
| 9,811,288 | B1* | 11/2017 | Chen .................... G06F 3/0679 |

(Continued)

OTHER PUBLICATIONS

Hui Sun et al., "Measuring and Analyzing Write Amplification Characteristics of Solid State Disks," 2013 IEEE 21st International Symposium on Modelling, Analysis & Simulation of Computer and Telecommunication Systems, Aug. 2013, pp. 212-221, IEEE Computer Society.

(Continued)

*Primary Examiner* — Gautam Sain
(74) *Attorney, Agent, or Firm* — Innovation Counsel LLP

(57) ABSTRACT

A method for allocating workloads based on a total cost of ownership (TCO) model includes receiving a workload; estimating a cost for allocating the workload to each disk of disks in a disk pool based on a TCO model; determining a disk among the disks in the disk pool that minimizes a TCO; and allocating the workload to the disk. The TCO model incorporates a plurality of cost factors for estimating costs for each disk in the disk pool for allocating the workload.

14 Claims, 4 Drawing Sheets

(56) References Cited

U.S. PATENT DOCUMENTS

2014/0149663 A1\*  5/2014  Golander .............. G06F 3/0605
                                                711/114
2015/0058863 A1   2/2015  Karamanolis et al.
2015/0237140 A1\*  8/2015  Murphy .............. H04L 67/1097
                                                709/216
2017/0031600 A1\*  2/2017  Kesavan .............. G06F 3/0605

OTHER PUBLICATIONS

Dhananjoy Das et al., "NVM Compression—Hybrid Flash-Aware Application Level Compression," INFLOW '14, Oct. 5, 2014, pp. 1-10, SanDisk Corporation, Broomfield, CO, USA.

Leonardo Marmol et al., "NVMKV: A Scalable and Lightweight Flash Aware Key-Value Store," Proceedings of the 2015 USENIX Annual Technical Conference (USENIX ATC '15), Jul. 2015, 5 pages, Santa Clara, CA, USA.

\* cited by examiner

ONLINE FLASH RESOURCE ALLOCATION MANAGER BASED ON A TCO MODEL

CROSS-REFERENCE TO RELATED APPLICATION(S)

This application claims the benefits of and priority to U.S. Provisional Patent Application Ser. No. 62/205,175 filed Aug. 14, 2015 and U.S. Provisional Patent Application Ser. No. 62/208,309 filed Aug. 21, 2015, the disclosures of which are incorporated herein by reference in their entirety.

TECHNICAL FIELD

The present disclosure relates generally to data storage systems and methods, more particularly, to a system and method for allocating online workloads to storage devices in a disk pool based on a TCO model.

BACKGROUND

Flash memory-based solid stated drives (SSDs) have been adopted in data centers primarily because of their superior I/O characteristics compared to Serial AT Attachment (SATA)-based SSDs. However, flash-based SSDs suffer from write amplification caused by the erase-before-rewrite limitation, and background garbage collection and wear levelling required for the flash memory. A write amplification factor (WAF) is defined as a ratio of physical writes to logical writes. Since SSDs have limited write (erase) cycles, a higher WAF shortens the device lifetime of the SSDs, and thus increases the cost of ownership of the datacenter. In addition, the lifetime, and hence the total cost of ownership (TCO) of the datacenter, is affected by the workloads running on the SSDs.

Existing WAF models for determining a WAF for SSDs primarily utilize the architectural characteristics of the SSD, garbage collection policies, and distribution of workloads (uniform or non-uniform) as factors. However, these WAF models do not consider the effects of workload sequentiality on WAF that may affect the workloads running on the SSDs, and hence the ultimate TCO.

SUMMARY

According to one embodiment, a method includes: receiving a workload; estimating a cost for allocating the workload to each disk of disks in a disk pool based on a TCO model; determining a disk among the disks in the disk pool that minimizes a total cost of ownership (TCO) by comparing costs estimated for the disks; and allocating the workload to the disk.

According to another embodiment, a system includes: a workload generator configured to generate a workload; a plurality of disks stored in a disk pool; a dispatcher comprising a storage that stores a TCO model and cost factors for each disk of the plurality of disks in the disk pool and a workload queue for storing workloads received from a host computer via a host interface. The dispatcher is configured to generate an estimated cost for allocating a workload stored in the workload queue to each disk of the plurality of disks based on a TCO model, determine a disk among the plurality of disks in the disk pool that minimizes a TCO by comparing costs estimated for the plurality of disks, and dispatch the workload to the disk.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
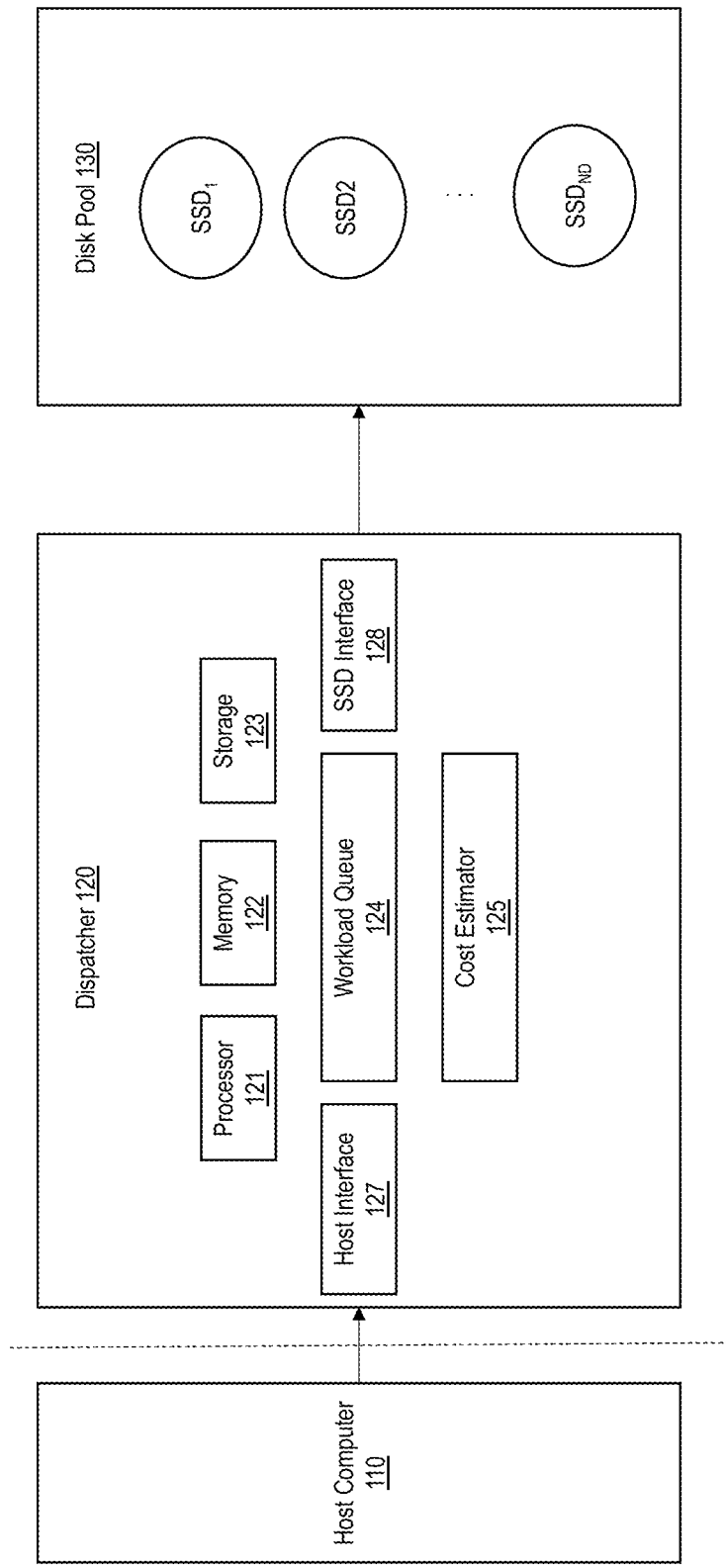
FIG. 1 shows a block diagram of an example flash-based storage system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide an online flash resource allocation manager based on a TCO model. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a total cost of ownership (TCO) model for a flash-based memory system. The TCO model takes into consideration various cost factors including, but not limited to, a lifetime of a disk, the sequentiality of workloads, and write wearout of the disks in a SSD disk pool. Using the TCO model, a dispatcher can run an algorithm (herein also referred to as minTCO) for minimizing a TCO for allocating workloads, and a dispatcher can allocate the workloads to a particular disk among the disks contained in a disk pool.

The TCO model that the dispatcher implements can be independent of a write amplification factor (WAF) of the disks, and any WAF model can be employed in the TCO model to calculate the TCO. Due to the independence of the TCO model from the WAF model, the dispatcher is applicable to any SSD storage system that includes different types or combinations of SSDs having different WAF characteristics. Examples of the SSD storage systems that the present TCO model is applicable to can include various types and combinations of non-volatile memories including, but not limited to, a flash memory, a phase-change RAM (PRAM), a spin-transfer torque magnetic random access memory (STT-MRAM), and a resistive RAM (ReRAM).

FIG. 1 shows a block diagram of an example flash-based storage system, according to one embodiment. The flash-based storage system includes a host computer 110, a dispatcher 120, and a disk pool 130 including a plurality of SSDs. The dispatcher 120 includes at least one processor 121, a memory 122, and a storage 123 for storing various programs and the associated data, and cost factors for each of the SSDs in the disk pool 130. Via a host interface 127, the dispatcher 120 receives a workload from the host computer 110 or a workload generator 301 shown in FIG. 3. The workload can include a write request to write data to one of the SSDs in the disk pool 130. The workload is stored in a workload queue 124 for further processing. First, the cost estimator 125 estimates a cost for allocating the workload to one of the SSDs in the disk pool 130 based on a cost model (e.g., a total cost of ownership (TCO) model). Based on the estimated costs to allocate the workload to each one of the SSDs in the disk pool 130, the cost estimator 125 determines which SSD in the disk pool 130 can minimize a TCO for allocating the workload. Via a SSD interface 128, the dispatcher 120 dispatches the workload to the SSD that was identified by the cost estimator 125 to minimize the TCO.

Although the dispatcher 120 is shown to be separate from the host computer 110 in FIG. 1, it is understood that the dispatcher 120 can run on the host computer as an application. A group of host computers may be present in a data center, and those host computers may communicate over a network to orchestrate the operation of the dispatcher 120 among the SSDs that may be distributed over the network.

According to one embodiment, the TCO model takes into account various cost factors of disks including the WAF and a lifetime of the SSDs. For example, flash memories (or any other non-volatile memories) included in an SSD can have a vendor-specific or vendor-influenced write amplification characteristics. The WAF for the SSD can vary depending on the manufacturer, the storage capacity, the type of the non-volatile memories, and the technologies used to manufacture the non-volatile memories, the operating environment, the age of the SSDs, etc.

According to one embodiment, the WAF of an SSD can be determined with experimental data that takes the sequentiality of workloads into consideration. It is noted that the WAF model can be obtained and implemented in different manners instead of experimentally measuring WAF and incorporating the experimental data into the WAF model. For example, the manufacturer-provided specification, an analysis tool, or a numerical formula for estimating a WAF can be used to build a WAF model without deviating from the scope of the present disclosure.

According to one embodiment, a TCO model can be built by incorporating the WAF model. A dispatcher implements the TCO model and can determine a SSD disk among the SSD disk pool that minimizes the overall TCO for a given workload. The TCO can be calculated using a number of cost factors including, but not limited to, a purchasing cost, a write cycle limitation, a number of writes to disks that have already happened, logical/physical writes per day, and a sequentiality ratio of each workload under consideration. Herein, a sequentiality ratio is defined as a ratio of sequential writes to total writes. Some of these factors may not be readily available to be used in the TCO model. For example, the sequential ratio and total write count of mixed write streams running on a disk may be estimated by a numerical formula.

According to one embodiment, the dispatcher can measure the WAF of an SSD with multiple workloads based on the sequentiality of the workloads. The TCO model takes into account additional cost factors such as a lifetime cycle of an SSD, the sequentiality of workloads, and the write wearout to minimize the total cost of ownership when allocating the workloads. In some embodiments, a numerical formula can be used to calculate statistics that are required for calculating the TCO but cannot be directly obtained from observing the SSDs.

Some embodiments of a dispatcher can translate the effects of WAF on TCO and incorporates WAF into the TCO model. Furthermore, the dispatcher and the dispatcher can be used for either static or dynamic (online) allocation of workloads to the SSDs in a SSD disk pool. The TCO model can be independent of the WAF model being used, as long as one is available. This makes the TCO model a flexible and scalable model that is able to be adapted to other types of storage medium having different WAF characteristics.

Some embodiments of a TCO model can take into consideration a number of cost factors such as disk write wearout (daily write rate of the currently running workloads), the sequentiality of workloads, etc. Some of the factors may be difficult to monitor and obtain from the SSD during runtime. The present dispatcher can apply various TCO models to profile and estimate status of SSDs as well as statistical information of workload streams running on the SSDs. Based on these inputs, the dispatcher can implement and run an online, self-tuning algorithm herein referred to as "minTCO". The minTCO can adaptively allocate new workload write streams to an SSD disk in a disk pool to minimize the TCO.

To simplify the description, the following symbols are used throughout the detailed description.

TABLE 1

List of Symbols

| Symbol | Description |
| --- | --- |
| $C_i$ | Cost of disk i |
| $E[T]_i$ | Expected flash work time of disk i |
| $T_{W_i}$ | Accumulated working time of disk i |
| $T_{E_i}$ | Expected working time in the future of disk i |
| $W_i$ | Total write limit of disk i |
| $w_i$ | Current write wearout count of disk i |
| $\lambda_{P_i}$ | Physical data write per day on disk i |
| $\lambda_{L_i}$ | Logical data write per day on disk i |
| $\lambda_{L_i}(t_x, t_y)$ | Logical data write per day of workloads on disk i during $t_x$ and $t_y$ |
| $\lambda_{L_{ji}}$ | Logical data write per day of workload $j_i$ (used in FIG. 3) |
| $A_i$ | Write amplification of disk i |
| $R_i$ | Workload set that are running in disk i |
| $R_i(t_x, t_y)$ | Workload set that are running in disk i during $t_x$ and $t_y$ |
| $S_i$ | (Total) sequential ratio of running workloads on disk i |
| $N_D$ | Total number of disks in the disk pool |
| $N_W$ | Total number of workloads in the workload generator |
| $T_i$ | Arrival time of all workloads running on disk i |

Write amplification is an undesirable phenomenon associated with flash memory devices where the actual amount of data written to a flash memory is larger than the logical amount of data written to the flash memory by a workload. Write amplification factor (WAF, herein also referred to as A) can be defined as a ratio of total physical data written by the workload to the total logical write data seen by the SSD:

$$A = \frac{PhysicalWriteIOSize}{LogicalWriteIOSize}$$

Being defined as such, a WAF of a flash memory-based SSD is greater than 1.

In general, a WAF that is specific to an SSD is difficult to measure because the WAF is typically vendor confidential information. For users, there are no standard ways to directly monitor or record the WAF of an SSD. In some embodiment, a vendor-supplied tool can be used to measure a WAF of an SSD. For example, the WAF of a certain vendor's SSD might be expressed as a polynomial function of the sequentiality of write operations in the workload:

$$A=aS^2+bS+c,$$

where a, b, and c are constants, and S is the sequentiality of the workload. The sequentiality S is defined as a ratio of sequential write I/O size over the sum of sequential write I/O size and the random write I/O size:

$$S = \frac{SequentialWriteIOSize}{SequentialWriteIOSize + RandomWriteIOSize}.$$

Various formulae can be used to calculate a TCO model implemented in the dispatcher. A generic TCO model can consider various cost factors including a purchase cost, installation, maintenance and operation, write wearout of an SSD, and so on. An important factor for determining the total cost is a wearout degree caused by the SSD's limited life cycle. The present TCO model can determine the total cost of ownership per a working time unit. For example, for a disk pool with $N_D$ SSD disks, the TCO is defined as a sum of an average cost C per an expected flash work time E[T] for each SSD in the disk pool:

$$TCO = \sum_{i=1}^{N_D} \frac{C_i}{E[T]_i} =$$

$$\sum_{i=1}^{N_D} \frac{C_i}{T_{W_i} + T_{E_i}} = \sum_{i=1}^{N_D} \frac{C_i}{T_{W_i} + \frac{W_i - w_i}{\lambda_{P_i}}} = \sum_{i=1}^{N_D} \frac{C_i}{T_{W_i} + \frac{W_i - w_i}{\lambda_{L_i} A_i}}.$$

The more expensive the original cost of the device, the more expensive the overall TCO is. Conversely, the longer the expected flash work time, the cheaper the TCO is.

The expected flash work time E[T] may not be directly obtained but can be calculated by the sum of the accumulated working time $T_W$ of each disk and the difference between the total write limit $W_i$ and the current write wearout count $w_i$ of the disk that is divided by the physical data write per day $\lambda_P$ of the disk. The physical data write per day $\lambda_P$ can be indirectly obtained by the logical data write per day $\lambda_L$ on the disk multiplied by the write amplification factor A of the disk that can be obtained experimentally or by the function defining the sequentiality (e.g., a polynomial function $A=aS^2+bS+c$).

Read I/O traffic does not result in any wearout to flash devices and hence the present TCO model does not account for read I/O traffic. In the present TCO model, only write workloads are accounted for as a cost factor because write workloads to SSDs cause write amplification and eventually affect the device lifetime and the overall TCO. A write stream model accounts for each workload that has its own write rate $\lambda$, with the sequentiality S, and the corresponding write amplification A.

In some embodiments of a TCO model, the cost $C_i$ for a disk i can be observed, and total write limit $W_i$ is fixed for every SSD. Therefore, the TCO model needs to calculate, monitor, or estimate the remaining parameters. For the write amplification $A_i$ for the disk i, the TCO model can use any WAF model based on the write amplification characteristics of the disk. Additional parameters required to build the TCO model include: (i) the logical writes rate per day $\lambda_{L_i}$ of multiple workloads running on a single disk, ii) the combined sequentiality of multiple workloads running on the disk $S_i$, and (iii) the current disk write wear-out count $w_i$. In some embodiments, the TCO model can use numerical formulae to estimate these parameters.

For the purpose of modeling and estimation, an example dispatcher can calculate the TCO based on the following assumptions. First, it is assumed that multiple workloads are isolated on a single disk. Multiple workloads can be assigned to a single SSD and can have separate segments of the total capacity, so that their working sets are mutually exclusive. Accordingly, the possible cross-workloads effects in an I/O path can be ignored.

Secondly, a write rate across different workloads to the same SSD is addable due to the segment isolation according to the first assumption. A write rate is herein defined as a number of write requests issued to an SSD per a unit time (e.g., a day). However, the total sequential ratio of multiple workloads running on a particular disk cannot be added up using their individual sequential ratios because different workloads can have different I/O sizes, and therefore their weights in a mixed write stream can vary.

Thirdly, a WAF of an SSD can be estimated using a sequentiality ratio. An example WAF model uses a WAF function to reflect the SSD as a black-box. Therefore, the WAF of an SSD can be estimated by using a weighted sequentiality ratio of multiple workloads that concurrently execute on the SSD.

Lastly, to devise a queueing theory model of an SSD for the purposes of TCO calculations, the service rate and waiting queue of each node (SSD in the pool) can be ignored. Furthermore, the disk capacity (total size) is irrelevant due to the assumption that the workload write rate can reflect the disk usage.

According to one embodiment, the present dispatcher calculates multiple workloads write streams in the following manner. First, logical data writes per day $\lambda_L$ are calculated. Since the present TCO model uses a WAF model to model an SSD, the write rate $\lambda_L$ is addable. For one disk, the $\lambda_L$ is a sum of write rates of all assigned workload streams during an epoch $(t_x, t_y)$:

$$\lambda_{L_i}(t_x, t_y) = \sum_{j \in R_i(t_x, t_y)} \lambda_{L_{ij}}.$$

Next, the present dispatcher calculates a total sequential ratio $S_i$ of running workloads of a disk i. Unlike an arrival rate, the mixed sequential ratio of multiple workloads is not equal to a sum of the sequential ratios of all workloads. A weight to each workload write stream that is equal to its write rate is assigned to estimate the total sequential ratio $S_i$. For multiple workloads running on a disk i, the total sequential ratio $S_i$ during an epoch $(t_x, t_y)$ can be calculated as follows:

$$S_i(t_x, t_y) = \frac{\sum_{j \in R_i(t_x, t_y)} (\lambda_{L_{ij}} S_{ij})}{\sum_{j \in R_i(t_x, t_y)} \lambda_{L_{ij}}}.$$

Lastly, an example dispatcher can calculate a current write wearout count $w_i$. The current write wearout count $w_i$ is defined as the total number of physical writes that can be experienced by an SSD before a failure occurs. It is difficult to monitor the current write wearout count $w_i$ of an SSD during runtime, so the present dispatcher estimates the current write wearout count $w_i$ using the information provided by the workloads' rates and their execution time. In one embodiment, the present dispatcher calculates the current write wearout count $w_i$ by summing the estimated write counts of all the workloads over all the epochs that have elapsed since the SSD was first used. For a certain epoch, the present dispatcher calculates a physical write rate by multiplying the total logical write rate with the corresponding WAF. The dispatcher further calculates the current write wearout count $w_i$ by multiplying the physical write rate with the length of the epoch. This process is repeated for all epochs of the disk, and the dispatcher can calculate the current write wearout count $w_i$. At a moment t, when a new workload is received, the dispatcher can calculate the current write wearout count $w_i$ by adding the new workload as follows:

$$w_i = \sum_{t_{ia} \in T_i} (\lambda_{L_i}(t_{ia}, t_{i(a+1)}) f_{SEQ}(S_i(t_{ia}, t_{i(a+1)}))(t_{i(a+1)} - t_{ia})),$$

where $t_{ia}$ and $t_{i(a+1)}$ represent the start time of the epoch a and (a+1) on the disk i.

Figure 2:
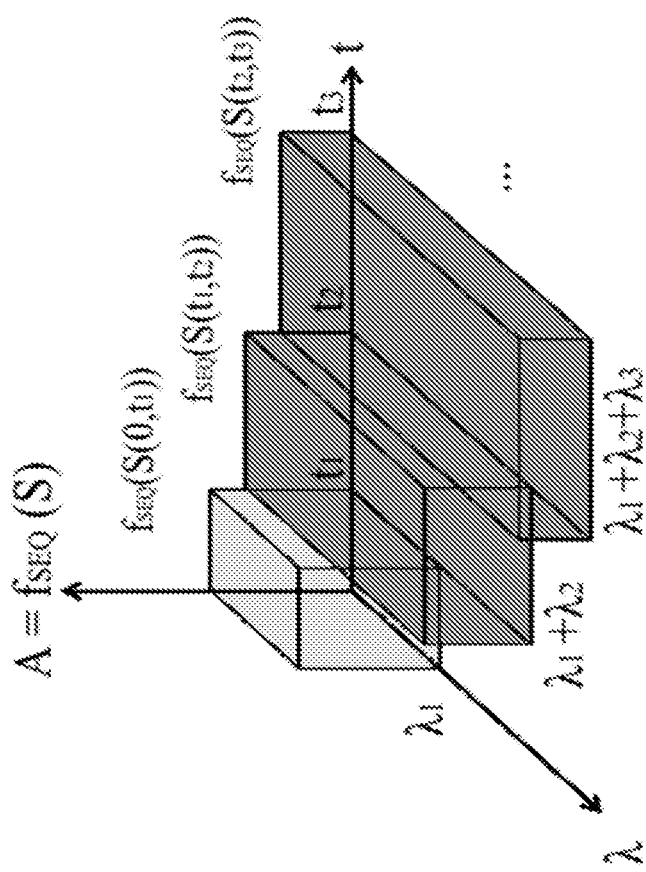
FIG. 2 shows an example of calculating a write wearout count of a disk, according to on embodiment.

FIG. 2 shows an example of calculating a write wearout count of a disk, according to on embodiment. Multiple write streams may run on a disk. The three axes, i.e., logical data writes per day $\lambda_L$, time t, and WAF $A=f_{SEQ}$ of FIG. 1 represent the three components of the equation for calculating the current write wearout count $w_i$. The volume of the cuboids represents the total write wearout count $w_i$ for a disk i.

With an arrival time of each workload, the start times $t_a$ and $t_b$ for each epoch can be obtained. $t_i$ is a set of arrival times of all workloads running on disk i, where $t_{ia}$ is the starting time of $a^{th}$ epoch of disk i. For the last workload in the disk i, the current time is used as its epoch ending time, $t_{i(a+1)}$. The current time may be determined by the moment when a new workload is received and a decision of allocation needs to be made, or just anytime when the TCO is evaluated.

Figure 3:
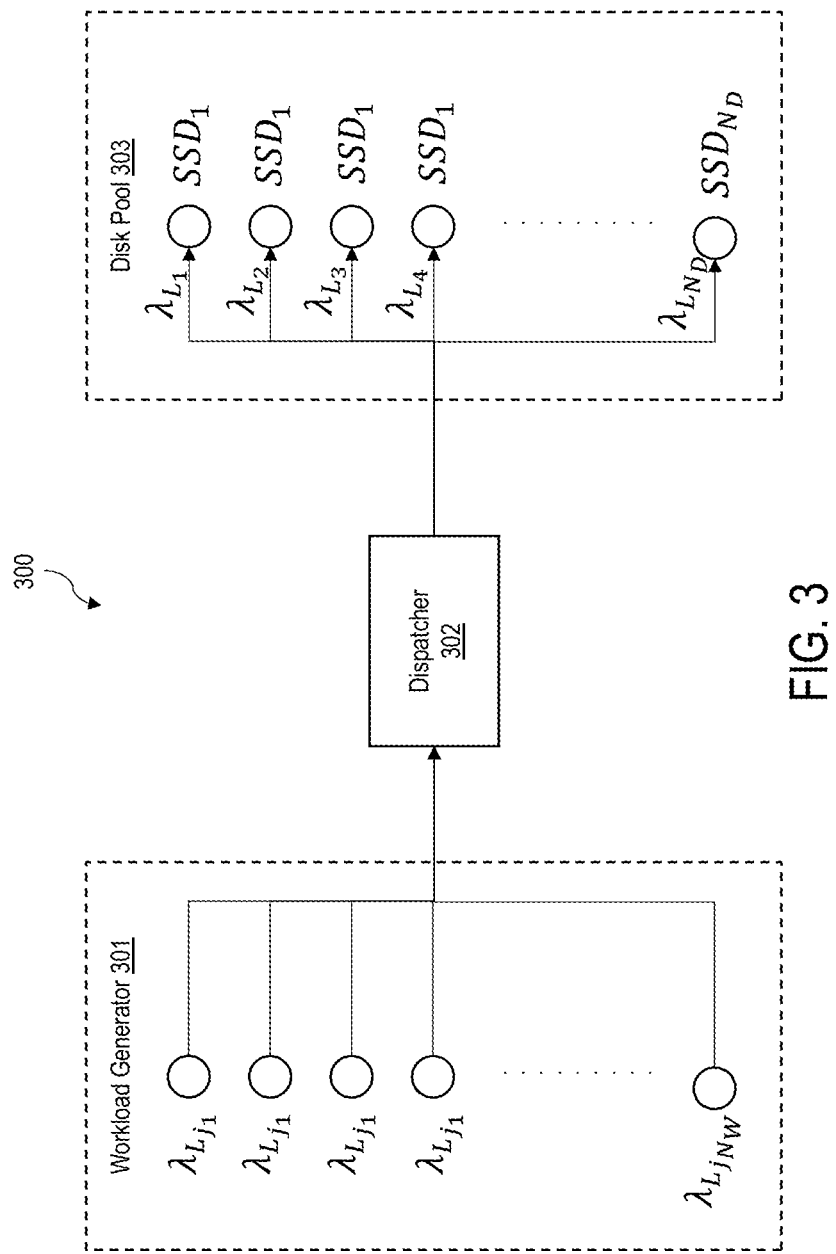
FIG. 3 illustrates an example architecture of a flash-based storage system, according to one embodiment.

According to one embodiment, an online allocation algorithm minTCO can be obtained based on the TCO model. FIG. 3 illustrates an example architecture of a flash-based storage system, according to one embodiment. The storage system includes a workload generator 301, a dispatcher 302, and a plurality of disks $SSD_1$-$SSD_{ND}$ contained in the disk pool 303.

The work generator 301 can receive a workload and the dispatcher 302 can estimate a cost for allocating the workload to each and every disk of a disk pool 303 using a TCO model. For example, an estimated cost for a disk i denotes a cost when the workload would be allocated to the disk i. The TCO model employed by the dispatcher 302 can use logical data writes per day $\lambda_L$ for each disk contained in the disk pool 303. The logical data writes per day $\lambda_L$ for the disk i can be obtained by summing up the estimated logical write rates of all assigned workload streams during an epoch. The physical write rates for the disk i can be estimated by multiplying the logical write rates in the workload streams with the corresponding WAF. The dispatcher 202 can implement the online allocation algorithm minTCO and determine a disk in the disk pool 303 that minimizes the TCO for allocating the workload to the disk pool 303 of the flash-based storage system 300. Based on the minimum TCO, the dispatcher 302 can dispatch the workload to the disk among $SSD_1$-$SSD_{ND}$ that minimizes the TCO. This process is repeated for a new workload as shown in FIG. 1

Algorithm 1 below show a code for an example minTCO algorithm, according to one embodiment. The minTCO algorithm describes the main functionality of the dispatcher 302. When a new workload arrives, the dispatcher 302 estimates a cost for allocating the new workload to each disk of a disk pool. The dispatcher 302 repeats this process for all the disks in the disk pool and can determine a disk that can would minimize a TCO among the costs estimated for the disk pool using the minTCO algorithm. The dispatcher 302 allocates the new workload to the disk that minimizes the TCO. It is noted that Algorithm 1 is presented as pseudocode, but is not intended to represent any particular programming language, or to even be compile.

When a new workload arrives, the dispatcher 202 calculates the TCO (i.e., a time-average TCO rate) for the entire disk pool (i=1 to ND) when the workload were assigned to the i_th disk, and then allocates the workload to the SSD with the lowest time-average TCO rate. Specifically, there are two cases for calculating the expected flash work time and total logical write amount of a disk i. The first case is when a new workload is assigned to disk k, (k can be or not be i). The dispatcher 202 uses the arrival time $T_{J_N}$ of the new workload as the boundary between the accumulated working time of disk k ($T_{W_k}$) and the expected flash work time of disk k in the future ($T_{E_k}$), as shown in Algorithm 1, lines 12 to 14. The second case is that when the new workload is not assigned to disk k (Algorithm 1, line 15 to 17), and the dispatcher 202 uses the arrival time of the most recent workload on disk k ($T_{R_k}$) as the boundary between $T_{W_k}$ and $T_{E_k}$ phases. It is noted that the present TCO model is compatible with any WAF model. In the present example, the dispatcher 202 adopts the WAF model described in 29 to implement functions in Algorithm 1, lines 14 and 17. In detail, getCostInt(k) and getCostMaint(k) return the initial cost and maintenance cost of disk k, respectively. getExpFutureWorkTime(k, $J_N$) returns the expected lifetime in the future if the new workload is added to this disk k. getExpFutureWorkTime( ) returns the expected lifetime in the future if the workload pattern keeps the same on disk k.

| | Algorithm 1: minTCO: |
|---|---|
| 1 | Procedure minTCO( ) |
| 2 | for incoming new workload $J_N$ do |
| 3 |   for i=1 to $N_D$ do |
| 4 |     TCO_List[i]=TCO_Assign(i, $J_N$) |
| 5 |   SelectedDisk=TCO_List.minValueIndex( ) |
| 6 |   Disk[SelectedDisk].addJob($J_N$) |
| 7 |   return |
| 8 | Procedure TCO_Assign(i, $J_N$) |
| 9 |   for k=1 to $N_D$ do |
| 10 |     $C_I$=getCostInt(k) |
| 11 |     $C_M$=getCostMaint(k) |
| 12 |     if k==i then |
| 13 |       $T_{W_k}$ = $T_{J_N}$ - $T_{I_k}$ |
| 14 |       $T_{E_k}$=getExpFutureWorkTime(k, $J_N$) |
| 15 |     else |
| 16 |       $T_{W_k}$ = $T_{R_k}$ - $T_{I_k}$ |
| 17 |       $T_{Ek}$=getExpFutureWorkTime( ) |
| 18 |     TCO+=$C_I$+$C_M$*($T_{W_k}$+$T_{E_k}$) |
| 19 |   return TCO/($T_{W_k}$+$T_{E_k}$) |

Figure 4:
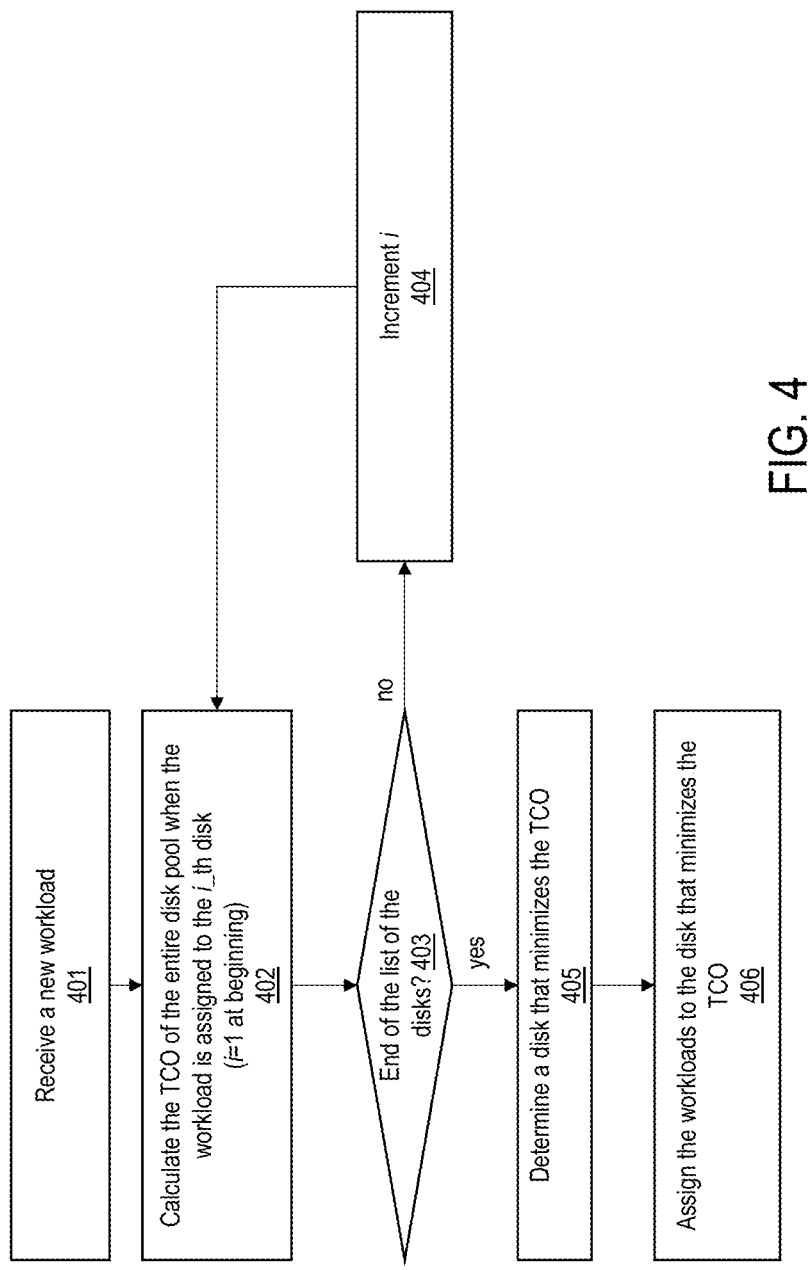
FIG. 4 shows an example flowchart for assigning a workload to a disk based on a TCO model, according to one embodiment.

FIG. 4 shows an example flowchart for assigning a workload to a disk based on a TCO model, according to one embodiment. The dispatcher receives a workload for a given epoch (step 401). The dispatcher estimates a cost for a disk i in a disk pool when the workload would be assigned to the disk i (step 402). The dispatcher repeats this process for each and every disk in the disk pool (steps 403, 404, and 402). After the costs for all the disks in the disk pool are obtained, the dispatcher determines a particular disk that minimizes a TCO (step 405). The dispatcher assigns the workload to the disk (step 406). This process is repeated for a new workload for a new epoch. The estimation of the costs and the determination of a disk that minimizes a TCO can be dynamically performed during runtime.

According to one embodiment, a method includes: receiving a workload; estimating a cost for allocating the workload to each disk of disks in a disk pool based on a TCO model; determining a disk among the disks in the disk pool that minimizes a total cost of ownership (TCO) by comparing costs estimated for the disks; and allocating the workload to the disk.

Media types of the disks in the disk pool may include one or more of a flash memory, a phase-change RAM (PRAM), a spin-transfer torque magnetic random access memory (STT-MRAM), and a resistive RAM (ReRAM).

The TCO model may incorporate a plurality of cost factors specific to the disks including a lifetime and a write wearout of the disks, and sequentiality of the workload.

The method may further include: obtaining a write amplification factor (WAF) for the disks in the disk pool based on one or more of a numerical formula of a sequentiality ratio of the workload, manufacturer-provided specification, and a WAF analysis tool.

The TCO model further incorporates a purchasing cost, a write cycle limitation, a number of writes occurred to the disks, logical/physical writes to the disks per day, and a sequentiality ratio of the workload.

The method may further include: obtaining a portion of write wearout count for each disk by multiplying logical data writes, the WAF, and a duration of a time period; and obtaining an expected flash work time for each disk.

The expected flash work time for each disk may be obtained by adding an accumulated working time of each disk and a difference between a total write limit and the write wearout count of the disk per a physical data write per day of the disk.

The physical data write per day of the disk may be obtained by a logical data write per day of the disk multiplied by a WAF of the disk.

According to another embodiment, a system includes: a workload generator configured to generate a workload; a plurality of disks stored in a disk pool; a dispatcher comprising a storage that stores a TCO model and cost factors for each disk of the plurality of disks in the disk pool and a workload queue for storing workloads received from a host computer via a host interface. The dispatcher is configured to generate an estimated cost for allocating a workload stored in the workload queue to each disk of the plurality of disks based on a TCO model, determine a disk among the plurality of disks in the disk pool that minimizes a TCO by comparing costs estimated for the plurality of disks, and dispatch the workload to the disk.

Media types for the plurality of disks in the disk pool includes one or more of a flash memory, a phase-change RAM (PRAM), a spin-transfer torque magnetic random access memory (STT-MRAM), and a resistive RAM (ReRAM).

The TCO model may incorporate a plurality of cost factors specific to the disks including a lifetime and a write wearout of each of the plurality disks, and sequentiality of the workload.

The dispatcher may be further configured to obtain a write amplification factor (WAF) for the plurality of disks in the disk pool based on one or more of a numerical formula of a sequentiality ratio of the workload, manufacturer-provided specification, and a WAF analysis tool.

The TCO model may further incorporate a purchasing cost, a write cycle limitation, a number of writes occurred to the plurality of disks, logical/physical writes to the plurality of disks per day, and a sequentiality ratio of the workload.

The dispatcher may be further configured to: obtain a write wearout count for each disk by multiplying logical data writes, the WAF, and a duration of a time period; and obtain an expected flash work time for each disk.

The expected flash work time for each disk may be obtained by adding an accumulated working time of each disk and a difference between a total write limit and the write wearout count of the disk per a physical data write per day of the disk.

The physical data write per day of the disk may be obtained by a logical data write per day of the disk multiplied by a WAF of the disk.

The above example embodiments have been described hereinabove to illustrate various embodiments of implementing a system and method for providing an online flash resource allocation manager based on a TCO model. Various modifications and departures from the disclosed example embodiments will occur to those having ordinary skill in the art. The subject matter that is intended to be within the scope of the invention is set forth in the following claims.

What is claimed is:

1. A method comprising:
receiving a plurality of workloads from a host computer via a host interface;
obtaining a write wearout count for each disk by multiplying logical data writes, a write amplification factor (WAF), and a duration of a time period;
obtaining an expected flash work time for each disk;
estimating a cost for allocating a workload of the plurality of workloads to each disk of disks in a disk pool based on a total cost of ownership (TCO) model;
determining a cost-minimizing disk among the disks in the disk pool that minimizes a total cost of ownership by comparing costs estimated for each of the disks in the disk pool, wherein a processor of a dispatcher that receives the plurality of workloads calculates the costs estimated for each of the disks in the disk pool; and
allocating the workload to the cost-minimizing disk via a storage device interface,
wherein the TCO model incorporates a plurality of cost factors including a lifetime, a purchasing cost, an installation and operating cost for each disk in the disk pool, the write wearout count, the WAF, the duration of the time period, and the expected flash work time, and calculates an operating cost of the disk pool in a datacenter based on a sum of the plurality of cost factors per the expected work time for each disk in the disk pool.

2. The method of claim 1, wherein the disks in the disk pool includes one or more of a flash memory, a phase-change RAM (PRAM), a spin-transfer torque magnetic random access memory (STT-MRAM), and a resistive RAM (ReRAM).

3. The method of claim 1, wherein the TCO model further incorporates sequentiality of the workload.

4. The method of claim 3, further comprising obtaining a write amplification factor (WAF) for the disks in the disk pool based on one or more of a numerical formula of a sequentiality ratio of the workload, manufacturer-provided specification, and a WAF analysis tool.

5. The method of claim 1, wherein the TCO model further incorporates a write cycle limitation, a number of writes occurred to the disks, logical/physical writes to the disks per day, and a sequentiality ratio of the workload.

6. The method of claim 1, wherein the expected flash work time for each disk is obtained by adding an accumulated working time of each disk and a difference between a total write limit and the write wearout count of the cost-minimizing disk per a physical data write per day of the cost-minimizing disk.

7. The method of claim 6, wherein the physical data write per day of the cost-minimizing disk is obtained by a logical data write per day of the cost-minimizing disk multiplied by the WAF of the cost-minimizing disk.

8. A system comprising:
a workload generator generating a plurality of workloads;
a plurality of disks stored in a disk pool;
a dispatcher comprising a processor, a storage storing a total cost of ownership (TCO) model and cost factors for each disk of the plurality of disks in the disk pool, a workload queue for storing the plurality of workloads received from a host computer via a host interface, and a cost estimator;
wherein the cost estimator is configured to instruct the processor of the dispatcher to generate an estimated cost for allocating a workload of the plurality of workloads stored in the workload queue to each disk of the plurality of disks based on the TCO model and determine a cost-minimizing disk among the plurality of disks in the disk pool that minimizes a TCO by comparing costs estimated for each of the plurality of disks in the disk pool, wherein the processor of the dispatcher that receives the plurality of workloads calculates the costs estimated for each of the disks in the disk pool;
wherein the processor of the dispatcher is further configured to obtain: a write wearout count for each disk by multiplying logical data writes, a write amplification factor (WAF), and a duration of a time period; and an expected flash work time for each disk,
wherein the TCO model incorporates a plurality of cost factors including a lifetime, a purchasing cost, an installation and operating cost for each disk in the disk pool, the write wearout count, the WAF, the duration of the time period, and the expected flash work time, and the processor of the dispatcher calculates the an operating cost of the disk pool in a datacenter based on a sum of the plurality of cost factors per the expected work time for each disk in the disk pool; and
wherein the processor of the dispatcher is further configured to dispatch the workload to the cost-minimizing disk via a storage device interface based on estimated costs by the cost estimator.

9. The system of claim 8, wherein the plurality of disks in the disk pool includes one or more of a flash memory, a phase-change RAM (PRAM), a spin-transfer torque magnetic random access memory (STT-MRAM), and a resistive RAM (ReRAM).

10. The system of claim 8, wherein the TCO model further incorporates sequentiality of the workload.

11. The system of claim 8, wherein the processor of the dispatcher is further configured to obtain a write amplification factor (WAF) for the plurality of disks in the disk pool based on one or more of a numerical formula of a sequentiality ratio of the workload, manufacturer-provided specification, and a WAF analysis tool.

12. The system of claim 8, wherein the TCO model further incorporates a purchasing cost, a write cycle limitation, a number of writes occurred to the plurality of disks, logical/physical writes to the plurality of disks per day, and a sequentiality ratio of the workload.

13. The system of claim 8, wherein the expected flash work time for each disk is obtained by adding an accumulated working time of each disk and a difference between a total write limit and the write wearout count of the cost-minimizing disk per a physical data write per day of the cost-minimizing disk.

14. The system of claim 13, wherein the physical data write per day of the cost-minimizing disk is obtained by a logical data write per day of the cost-minimizing disk multiplied by the WAF of the cost-minimizing disk.

\* \* \* \* \*